US 6,667,851 B2

(12) United States Patent
Imamura et al.

(10) Patent No.: US 6,667,851 B2
(45) Date of Patent: Dec. 23, 2003

(54) MAGNETIC TAPE CASSETTE WITH LIGHT SHIELDING MEMBER

(75) Inventors: Toshio Imamura, Yokohama (JP); Rumi Omido, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 168 days.

(21) Appl. No.: 09/955,950

(22) Filed: Sep. 20, 2001

(65) Prior Publication Data

US 2002/0034047 A1 Mar. 21, 2002

(30) Foreign Application Priority Data

Sep. 20, 2000 (JP) ........................ 2000-284899

(51) Int. Cl.[7] .................... G11B 23/087; G11B 15/22
(52) U.S. Cl. ...................................... 360/132
(58) Field of Search ................. 360/132, 74.6; 242/344, 357

(56) References Cited

U.S. PATENT DOCUMENTS

| 5,121,275 A | * | 6/1992 | Komiyama | 360/132 |
| 5,295,637 A | * | 3/1994 | Takeda et al. | 242/344 |
| 5,390,871 A | * | 2/1995 | Gelardi et al. | 242/347.2 |
| 5,579,191 A | * | 11/1996 | Alexander et al. | 360/132 |
| 5,657,936 A | * | 8/1997 | Ohgi et al. | 242/344 |
| 5,850,980 A | * | 12/1998 | Koizumi | 242/344 |

FOREIGN PATENT DOCUMENTS

| JP | 11-144431 A | * | 5/1999 |
| JP | 11-238354 A | * | 8/1999 |
| JP | 2000-123332 A | * | 4/2000 |

* cited by examiner

*Primary Examiner*—Jefferson Evans
(74) *Attorney, Agent, or Firm*—Connolly Bove Lodge & Hutz LLP

(57) ABSTRACT

A magnetic tape cassette for use in an apparatus having a light source (P) and a light sensor (S1, S2) for detecting a tape end by the difference of light transmittance of a tape (T). The magnetic tape cassette (AA, BB, CC) is composed of a light-shielding member (a through r) crossing a light path (L1, L2) for detecting the tape end by the difference of light transmittance of the magnetic layer portion and the leader portion to keep the light transmittance within the predetermined value even the tape (T) is thinner and has a higher light transmittance.

3 Claims, 6 Drawing Sheets

MAGNETIC TAPE CASSETTE WITH LIGHT SHIELDING MEMBER

BACKGROUND OF THE INVENTION

1. Field of the Invention

The present invention relates to a magnetic tape cassette loaded with a thinner magnetic tape for long time recording having a structure capable of detecting a tape end of the thinner magnetic tape accurately.

2. Description of the Related Art

FIG. 5(a) is a plan view of a magnetic tape cassette loaded with a magnetic tape (hereinafter referred to as a "tape cassette") composed of an upper half cassette housing 1D and a lower half cassette housing 2D, wherein an upper half cassette housing 1D is removed. FIG. 5 (b) is a side view of the tape cassette from a supply reel side. FIG. 5(c) is a side view of the tape cassette from a take-up reel side.

In FIG. 5(a), a tape cassette DD is composed of a lower half cassette housing 2D, a light exit 3D on the side of a supply (SP) reel 5D, a light exit 4D on the side of a take-up (TU) reel 6D, the SP reel 5D for supplying a magnetic tape T through a tape travel path to the TU reel 6D, the TU reel 6D for winding in the magnetic tape T supplied from the SP reel 5D, a tape pad 7D for padding the magnetic tape T on a pole incorporated in the lower half cassette housing 2D for guiding the magnetic tape T to the tape travel path, a lock plate 8D for locking a front cover on the upper half cassette housing 1D not shown, a detecting light hole 9D for inserting a detecting light device P incorporated in an apparatus not shown, a pair of light holes 9Da and 9Db for passing the light emitted from the detecting light device P, light paths L1 and L2 for showing the light path of the light emitted from the detecting light device P, a pair of light exits 3D and 4D for passing the light emitted from the detecting light device P through the light paths L1 and L2 to a pair of light sensors S1 and S2 respectively.

The pair of light sensors S1 and S2 shown in FIG. 5(a) is incorporated in the apparatus for the tape cassette, such as a video tape cassette recorder (hereinafter referred to as "VCR") not shown. As the tape cassette DD is loaded into a predetermined position in the VCR, the light exits 3D and 4D are opposed to the light sensors S1 and S2 respectively, within a prescribed distance.

As to the magnetic tape T for the tape cassette, each end of the magnetic tape T is connected with a transparent leader tape not shown, and another end of each leader tape is connected with a hub of the SP reel 5D and the TU reel 6D respectively.

As the tape cassette DD is loaded into a predetermined position in the VCR, the detecting light device P is inserted in the detecting light hole 9D. The light emitted from the detecting light device P passes through the light holes 9Da and 9Db respectively and forms the light paths L1 and L2, and reaches the light sensors S1 and S2 through the light exits 3D and 4D respectively.

Generally, the upper and lower half cassette housings 1D and 2D for the tape cassette DD are made of a material having lower light transmittance (such as a dark colored plastic). As the light paths L1 and L2 cross the travel path of the magnetic tape T and the magnetic tape T also has lower light transmittance, the light sensors S1 and S2 can not receive the light when the magnetic tape T crosses the light paths L1 and L2. This is a case of the tape end being undetected.

In the meantime, the leader tape is made of a transparent or semitransparent material having higher light transmittance. In this sense, as the leader tape crosses the light paths L1 and L2, the light sensors S1 and S2 receive the light from the detecting light device P. This is a case of the tape end being detected. As the amount of light, which is received by the light sensors S1 and S2, changes remarkably from less to more than a predetermined value, the tape end can be detected.

In addition, at least, if the light sensor S1 receives the light from the detecting light device P, the tape end is determined to be the last end that there is no more magnetic tape coming from the SP reel 5D, and if the light sensor S2 receives the light from the detecting light device P, the tape end is determined to be the starting end that the magnetic tape is coming from the SP reel 5D.

In case of a "VHS" (registered trademark) format tape cassette, the magnetic tape having a thickness in the range of 17 $\mu$m to 20 $\mu$m (a standard tape cassette having the recording time of 120 minutes in the standard speed mode) should have a light transmittance of 1.2% or less, and the leader tape should have a light transmittance of 50% or more. The tape end can precisely be detected by the great difference between the light transmittances of the magnetic tape and the leader tape within the above range.

As the "VHS" format tape cassette additionally adopted a thinner magnetic tape for long time recording of which thickness is in the range of 11 $\mu$m to 13 $\mu$m. For example, a magnetic tape with 11.3 $\mu$m thickness has the light transmittance of 1.7% which is above 1.2%. The tape end can accurately be detected by the magnetic tape having light transmittance under 1.2% but the tape end of the thinner magnetic tape having light transmittance of 1.7% may not accurately be detected.

If the tape end of the magnetic tape cassette can not be detected accurately, it will affect the function of "VHS" format VCRs and maintenance of compatibility among the "VHS" format products (such as cassette and VCR). Accordingly, the light transmittance for even thinner magnetic tape should be kept under 1.2%.

In order to secure the light transmittance of 1.2% for the thinner magnetic tape, a light-shielding material such as carbon is admixed in a magnetic layer of the magnetic tape. Unfortunately this is accompanied by a decrease of the electromagnetic conversion characteristic. In case of even thinner magnetic tape, it becomes more difficult to maintain both the electromagnetic conversion characteristic and the mechanical strength characteristic.

SUMMARY OF THE INVENTION

Accordingly, in consideration of the above-mentioned problems of the related art, an object of the present invention is to provide a magnetic tape cassette (AA, BB, CC) used in an apparatus having a light source (P) and a light sensor (S1, S2) for detecting a tape end by the difference of light transmittance of a tape loaded in the magnetic tape cassette, the magnetic tape cassette including, a tape (T) having a magnetic layer portion for recording and reproducing information and a leader portion connecting with a reel (5, 6) for winding up and release the tape thereof, wherein the leader portion has higher light transmittance than the magnetic layer portion, a cassette housing (1A, 2A) for having the reel (5, 6) being connected with the tape (T), and a light exit (3, 4) being opposed to the light sensor (S1, S2) when the magnetic tape cassette is loaded to a predetermined position in the apparatus, for passing light from the light source (P)

to the light sensor (S1, S2) through the light exit (3, 4), wherein a light path (L1, L2) of the light emitted from the light source (P) crosses a travel path of the tape (T), and wherein the cassette housing further includes an upper half cassette housing (1A, 1B, 1C) and a lower half cassette housing (2A, 2B, 2C), and a light-shielding member for shielding the light path to make light transmittance of the tape (T) being detected by the light sensor (S1, S2) at a predetermined value.

Other object and further features of the present invention will be apparent from the following detailed description when read in conjunction with the accompanying drawings.

DETAILED DESCRIPTION OF THE PREFERRED EMBODIMENTS

The present invention is to provide a tape cassette having a structure for decreasing 50% to 55% of the light transmittance of the light in light paths L1 and L2 to use a magnetic tape T having the light transmittance of 1.2% to 2.4% (at maximum).

[First Embodiment]

Figure 1:
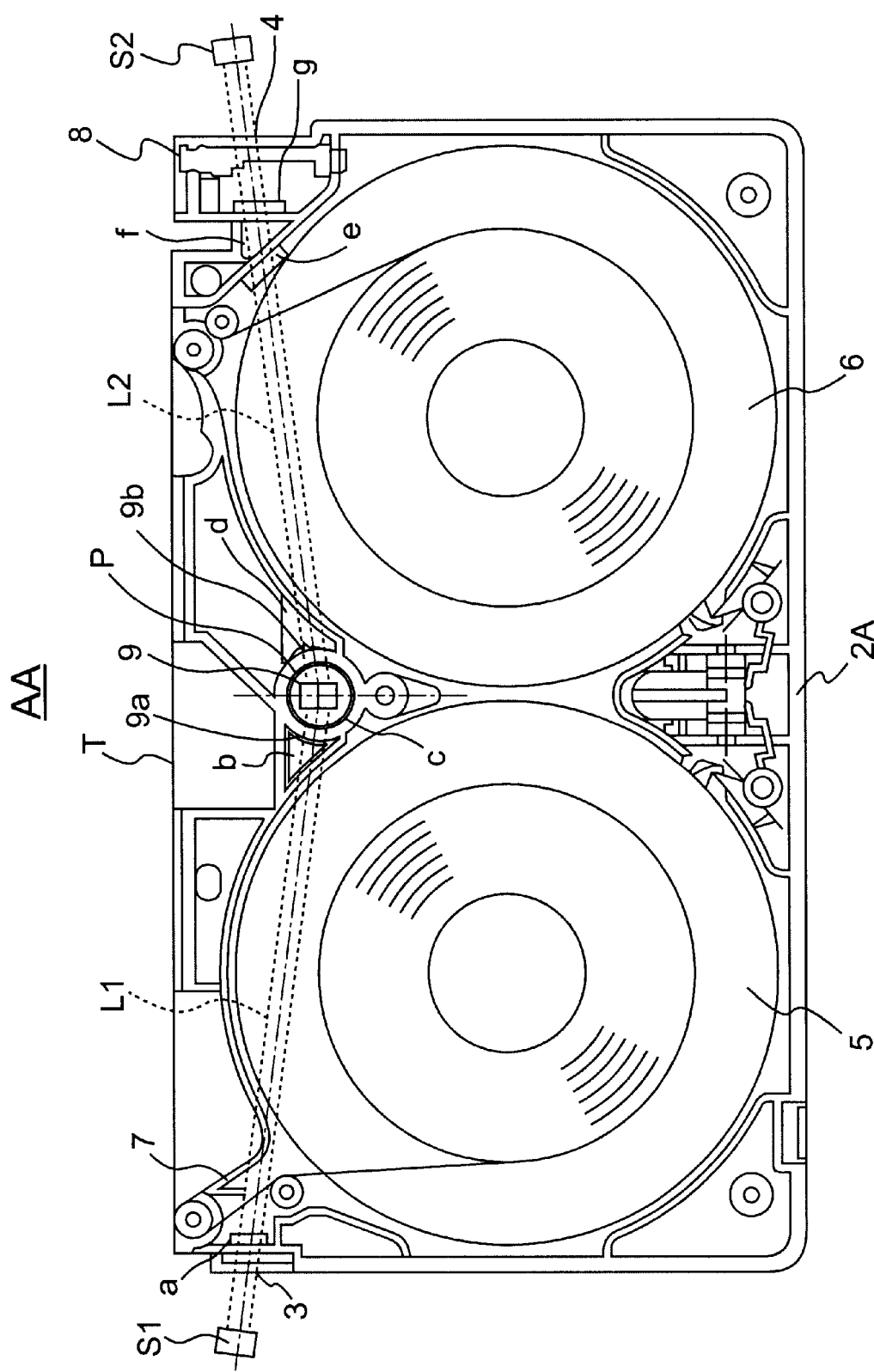
FIG. 1 is a plan view of a magnetic tape cassette according to a first embodiment of the present invention.

FIG. 1 is a plan view of an inside structure of a magnetic tape cassette (hereinafter referred to as a "tape cassette") according to a first embodiment of the present invention. In FIG. 1, a tape cassette AA is composed of a lower half cassette housing 2A, a light exit 3 on the side of a supply (SP) reel 5 for supplying a magnetic tape T to a prescribed tape travel path, a light exit 4 on the side of a take-up (TU) reel 6 for rewinding the magnetic tape T through the tape travel path, a tape pad 7 for padding the magnetic tape T on a pole incorporated in the lower half cassette housing 2A, a lock plate 8 for locking a front cover on the upper half cassette housing not shown, a detecting light hole 9 for inserting a detecting light device P incorporated in an apparatus not shown, a pair of light holes 9a and 9b for passing the light emitted from the detecting light device P, light paths L1 and L2 for showing the path of light emitted from the detecting light device P crossing the tape travel path, a pair of light sensors S1 and S2 incorporated in the apparatus for receiving the light emitted from the detecting light device P through the light exit 3 and 4 respectively, and light-shielding members "a" through "g" on the light paths L1 and L2.

This first embodiment is to provide a tape cassette AA having at least one piece of light-shielding members "a" through "g" on the light paths L1 and L2 to decrease 50% to 55% of light transmittance of the light emitted from the light exit 3 and 4 so that the light transmittance of the light at the light sensors S1 and S2 will be 1.2% or below. Consequently, the tape end can be detected even the magnetic tape T itself has light transmittance from 1.2% to 2.4% (at maximum) with thinner tape thickness and enhanced electromagnetic conversion characteristics.

In FIG. 1, the tape pad 7, the lock plate 8 and various shape of ribs of the lower half cassette housing 2A cross the light paths L1 and L2. In order to pass the light emitted from the detecting light device P to the light sensors S1 and S2, each of tape pad 7 and lock plate 8 has a hole (not shown) to pass the detecting light. The ribs of the lower half cassette housing 2A which cross the light paths L1 and L2 have a cut area to pass the detecting light.

The physical characteristic (such as light transmittance), a shape and a color for the light-shielding members "a" through "g" can be determined selectively from a colored plastic plate or a glass filter or other material, under condition that the light transmittance for the light coming out from the light exit 3 and 4 is within the range of 50% or more for the leader tape and 1.2% or less for the magentic tape by using such light-shielding members.

In the case of the first embodiment of the present invention, the light-shielding member "a" is installed adjacent to the light exit 3 to cover the same on inside wall of the lower half cassette housing 2A. The light-shielding member "b" is installed in the frame rib of the lower half cassette housing 2A adjacent to the light hole 9a to cover the same. The light-shielding member "c" is installed in the detecting light hole 9 to cover both the light 9a and the light hole 9b. The light-shielding member "d" is installed in the frame rib of the lower half cassette housing 2A adjacent to the light hole 9b to cover the same. The light-shielding member "e" is installed in the frame rib of the lower half cassette housing 2A adjacent to the tape travel path to the TU reel 6 to block the light path L2. The light-shielding member "f" is installed in opposite side of the frame rib where the light-shielding member "e" is installed, to block the light path L2. The light-shielding member "g" is installed in the inside wall surrounded by the frame rib of the lower half cassette housing 2A where the lock plate 8 is installed, to block the light path L2.

The light-shielding members "a" through "g" can be selectively placed on the light paths L1 and L2 to reduce 50% to 55% of light transmittance of the light coming out from the light exits 3 and 4 respectively. Accordingly, the light transmittance of the light coming out from the light exits 3 and 4 will be within the range of 50% or more through the leader tape, and 1.2% or less through the magnetic tape T.

[Second Embodiment]

Figure 2:
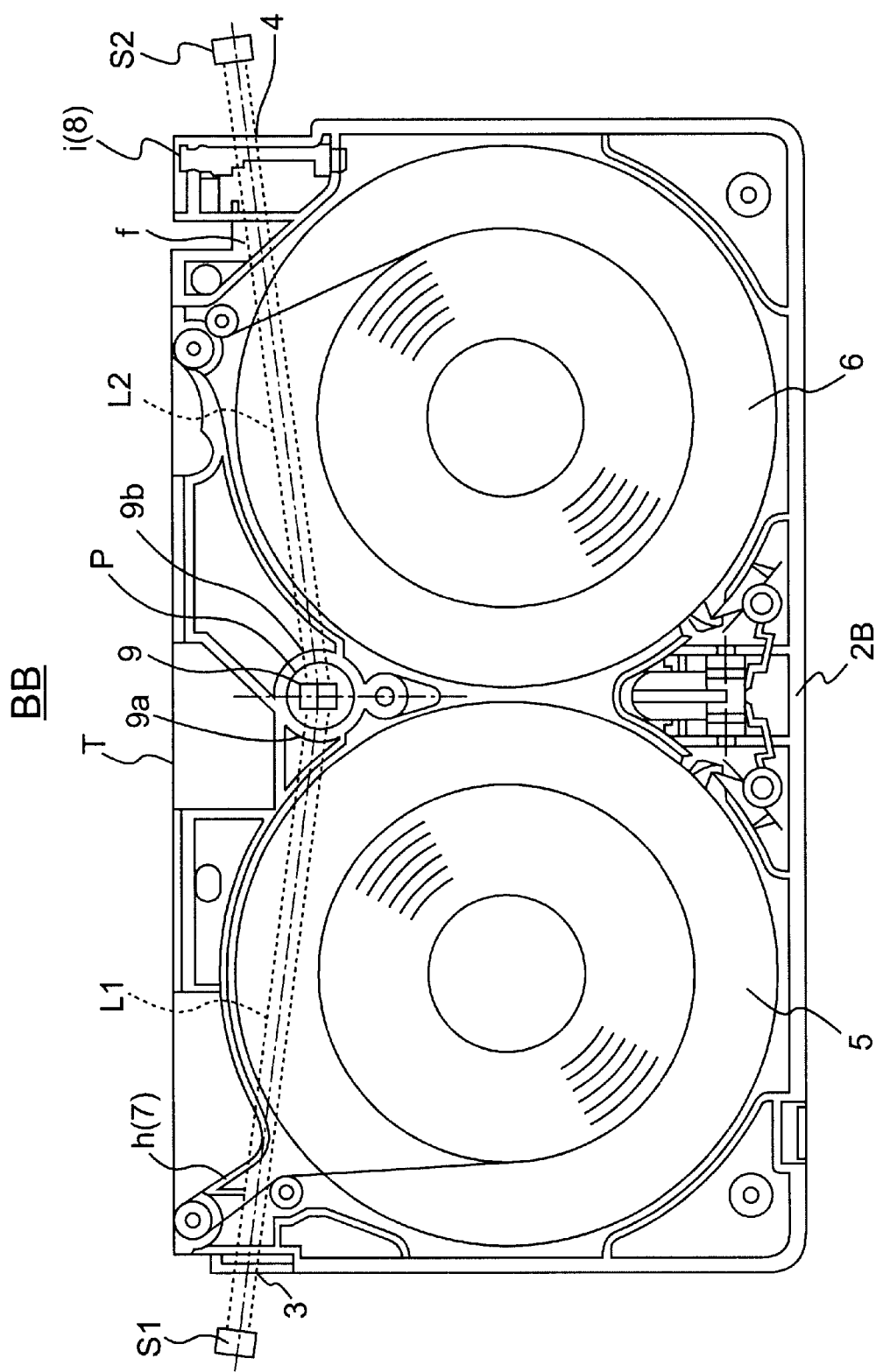
FIG. 2 is a plan view of a magnetic tape cassette according to a second embodiment of the present invention.

FIG. 2 is a plan view of an inside structure of tape cassette according to a second embodiment of the present invention. In FIG. 2, a tape cassette BB is composed of a lower half cassette housing 2B, light exits 3 and 4, a SP reel 5 for supplying a magnetic tape T to a TU reel 6 through the prescribed tape path, a detecting light hole 9 for inserting a detecting light device P incorporated in the apparatus not shown, a pair of light holes 9a and 9b, a light paths L1 and L2 for showing the light path of the light emitted from the detecting light device P, a pair of light sensors S1 and S2 incorporating in the apparatus for receiving the light emitted from the detecting light device P through the light exit 3 and 4 respectively, and a tape pad "h" for guiding the magnetic tape T and a lock plate "i" for locking a front cover (not shown) of the tape cassette BB.

Generally, a tape pad and a lock plate are placed on the light path L1 and L2 respectively, and they usually have a hole or a cut area for passing the light from the detecting light device P. The second embodiment is to provide the tape pad "h" instead of the tape pad 7 of the first embodiment and the lock plate "i" without the hole or cut area for passing the light from the detecting light device P. Accordingly, in FIG. 2, the tape pad is shown as "h(7)" and the lock plate is shown as "i(8)"

The tape pad "h" and the lock plate "i" can be formed by a colored material such as a plastic or a glass filter or other material to reduce 50% to 55% of the light transmittance of light coming out from the light exit 3 and 4 respectively. Accordingly, the light transmittance of the light coming out from the light exit 3 and 4 will be within the range of 50% or more through the leader tape, and 1.2% or less through the magnetic tape T.

[Third Embodiment]

Figure 3:
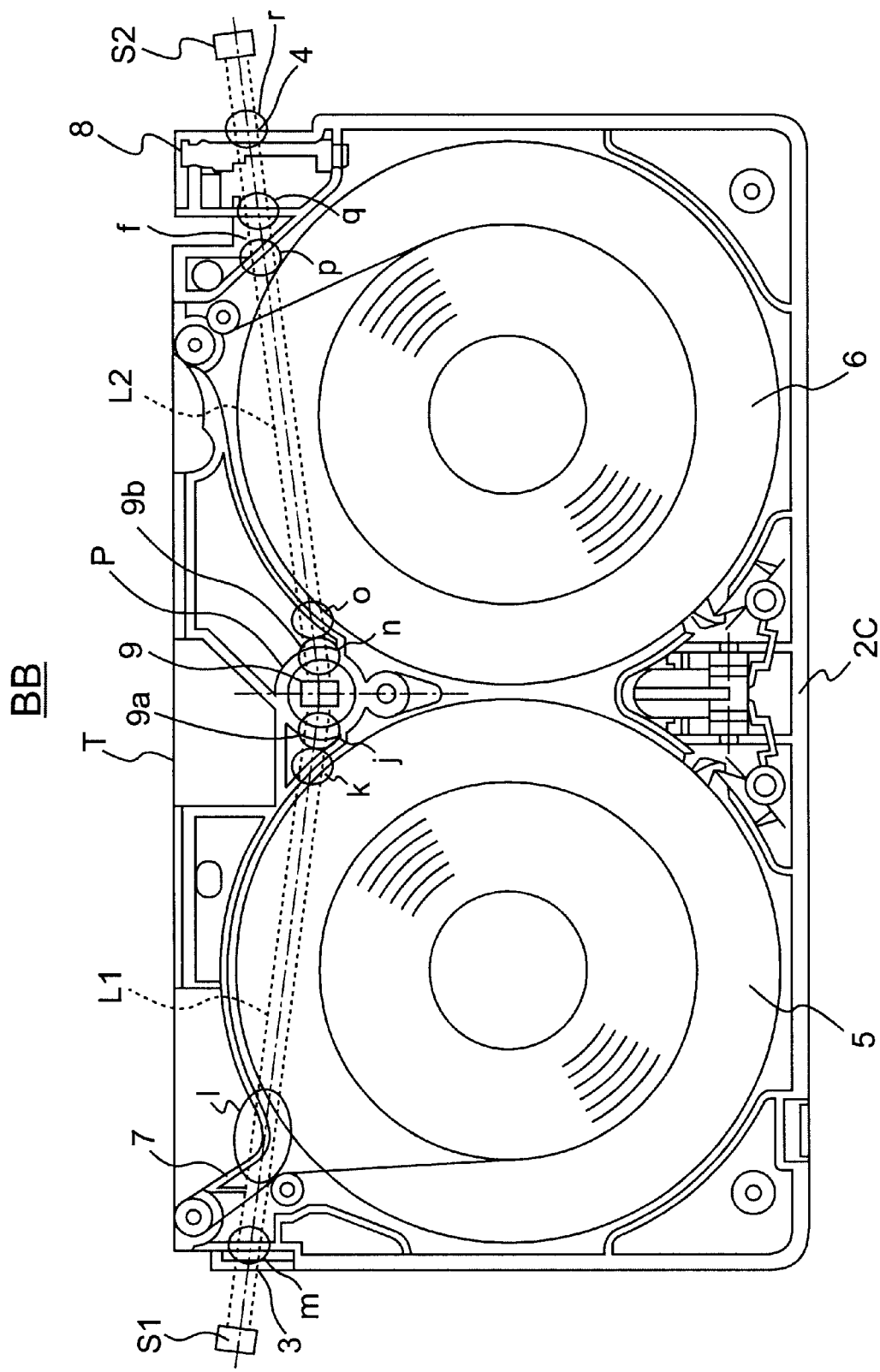
FIG. 3 is a plan view of tape cassette according to a third embodiment of the present invention.

FIG. 3 is a plan view of an inside structure of tape cassette according to a third embodiment of the present invention. In FIG. 3, a tape cassette CC is composed of a lower half cassette housing 2C, the light exits 3 and 4, a SP reel 5 for supplying a magnetic tape T to a TU reel 6 through the prescribed tape travel path, a tape pad 7 for padding the magnetic tape T on a pole incorporated in the lower half cassette housing 2C, a lock plate 8 for locking the front cover on the upper half cassette housing not shown, a detecting light hole 9 for inserting a detecting light device P incorporated in a apparatus not shown, a pair of light holes 9a and 9b, light paths L1 and L2 for showing the light path of the light emitted from the detecting light device P, a pair of light sensors S1 and S2 incorporated in the apparatus for receiving the light from the light exits 3 and 4 respectively, and frame members "j" through "r" formed in the light paths L1 and L2 on the lower half cassette housing 2C.

This third embodiment is to provide a tape cassette having the frame members "j" through "r" of the lower half cassette housing 2C on the light paths L1 and L2. Generally, frame members in the position of "j" through "r" have cut area to pass the detecting light from the detecting light device P. The frame members "j" through "r" according to the third embodiment has no cut area but made of material which can decrease 50% to 55% of the light transmittance of the light coming out from the light exits 3 and 4.

The frame members "j" through "r" are not limited to being molded in the lower half cassette housing 2C but also in the upper half cassette housing in which frame members are on the light paths L1 and L2. The frame members "j" through "r" can selectively be molded in both or either lower or upper half cassette housing as long as the light transmittance of the light coming out from the light exits 3 and 4 will be within the range of 50% or more through the leader tape, and 1.2% or less through the magnetic tape T.

As long as the light transmittance for the light comes out from the light exits 3 and 4 are reduced to the range of 50% to 55%, there can be more than one frame member formed in both light paths L1 and L2. In addition, as the frame member is molded in the lower half cassette housing 2C, the color and the material of the upper half cassette housing 1C and the lower half cassette housing 2C should be determined to achieve the light transmittance for the light coming out from the light paths 3 and 4 reduced to the range of 50% to 55%.

A plurality of the frame members "j" through "r" can be formed in the lower cassette housing 2C that one or more frame members may have a small window for passing light radiated in the light paths L1 and L2 to keep the above light transmittance range.

According to the present invention mentioned above, there provided a tape cassette, which satisfies the "VHS" specification of the light transmittance for a magnetic tape and a leader tape.

Figure 4:
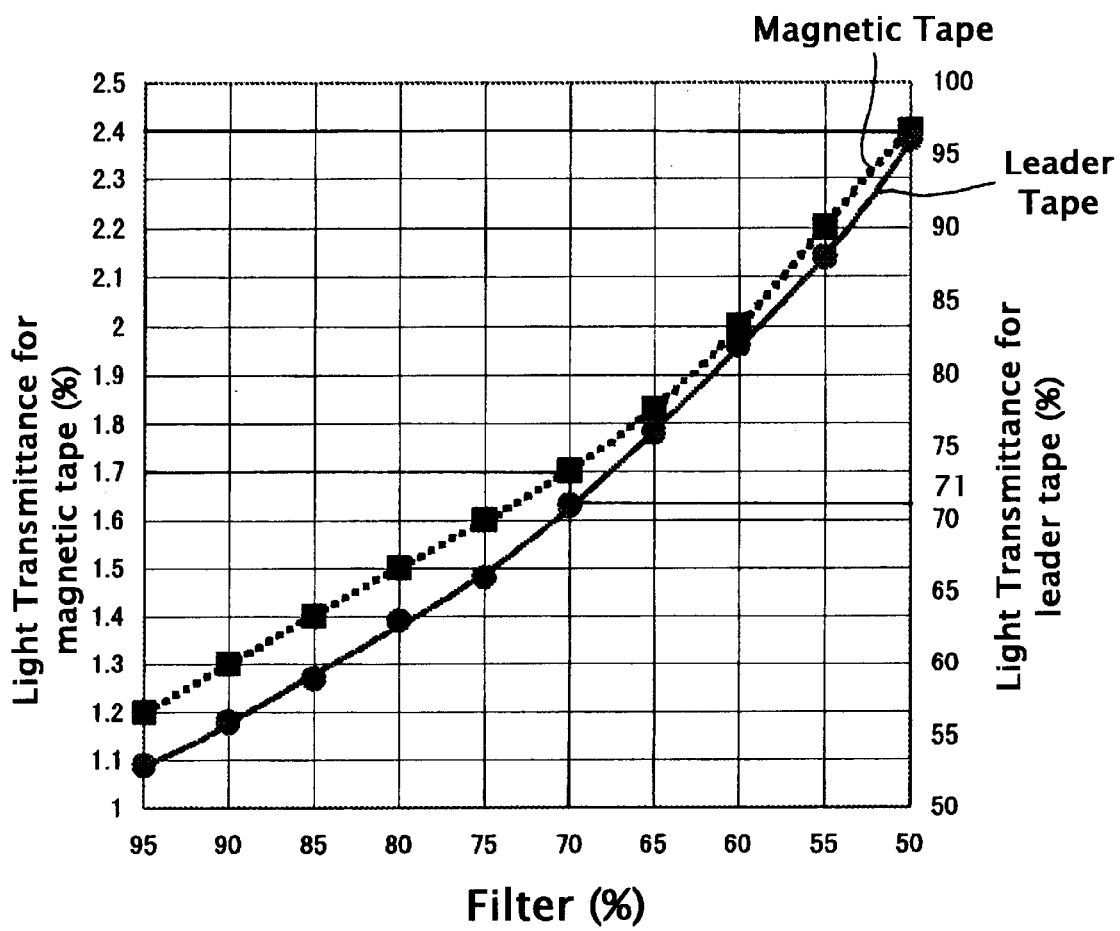
FIG. 4 is a diagram showing a transmittance for a magnetic tape and a leader tape for the magnetic tape cassette in accordance with the present invention.
Figure 5A:
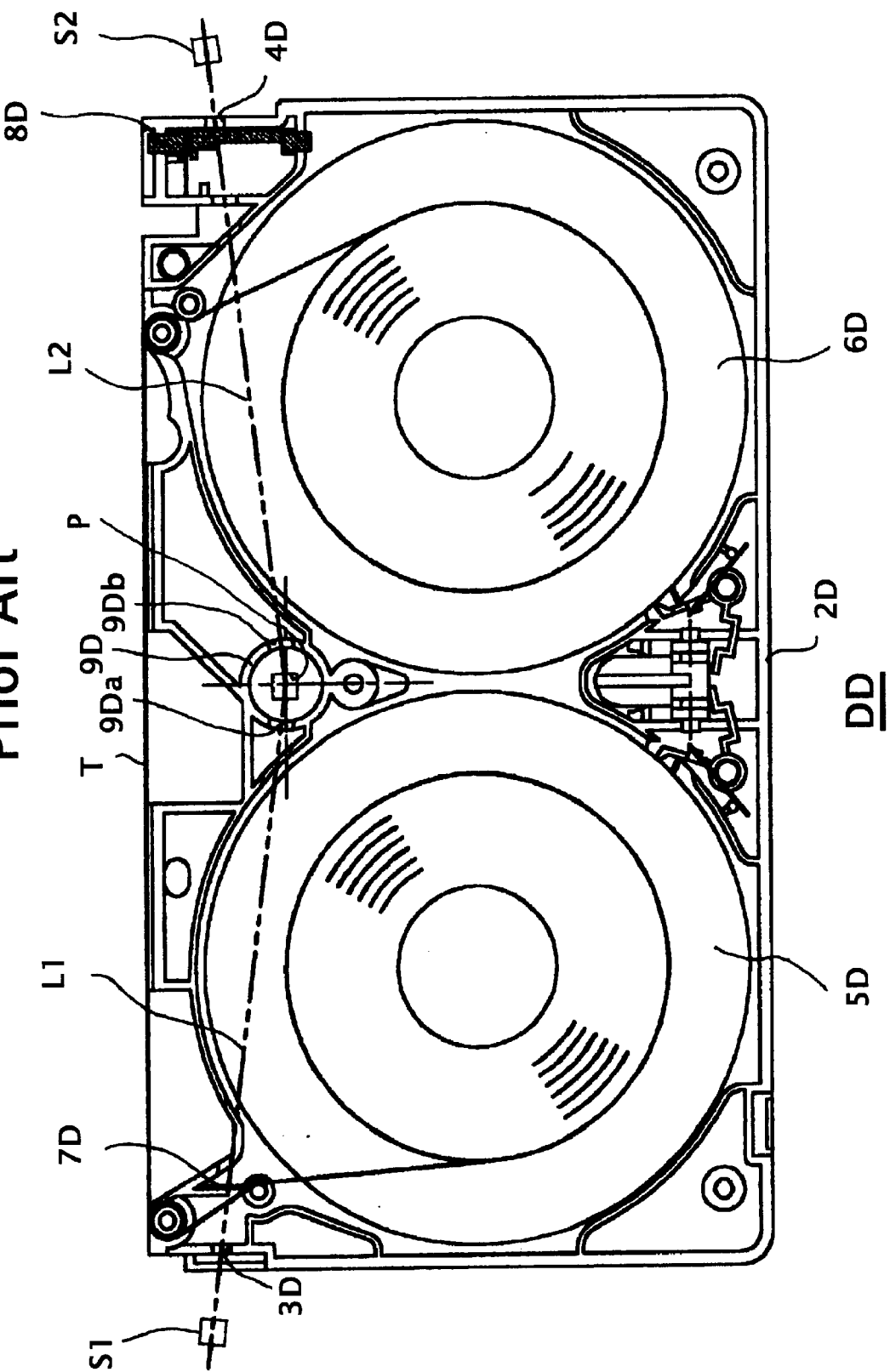
FIG. 5(a) is a plan view of the magnetic tape cassette in accordance with the prior art.
Figure 5:
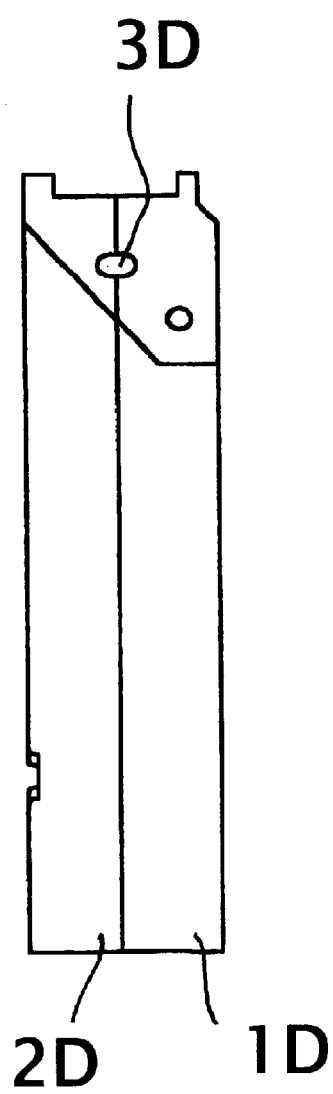
FIG. 5(b) is a side view from the SP side of the magnetic tape cassette shown in FIG. 5(a).
FIG. 5(c) is a side view from the TU side of the magnetic tape cassette shown in FIG. 5(a).
Figure 5:
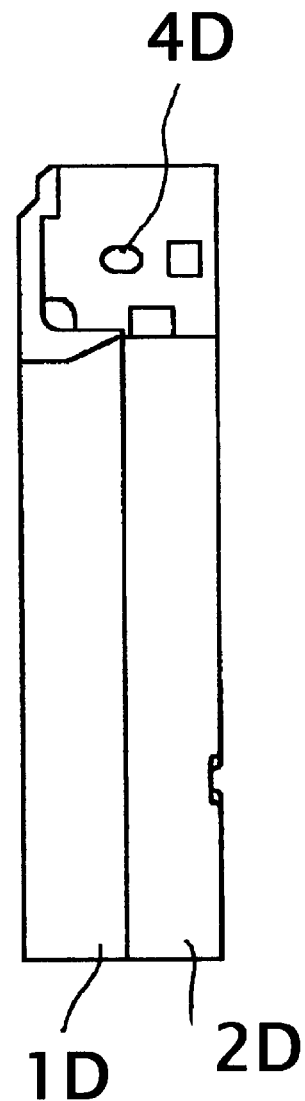

FIG. 4 is a diagram showing the light transmittance for the magnetic tape T and the leader tape for the tape cassette in accordance with the present invention. The left vertical axis is the light transmittance for the magnetic tape T, the right vertical axis is the light transmittance for the leader tape, and the horizontal axis is the light transmittance for a filter member to be placed in the light paths L1 and L2 respectively. The characteristic of light transmittance for the magnetic tape T is shown in a dotted line and the same for the leader tape is shown in a solid line.

The light-shielding member, the tape pad, the lock plate and the frame member as described above is adjusted to have the characteristic of the light transmittance shown in FIG. 4, by using the filter member having the transmittance of 50%, so that the light transmittance for the leader tape will be in the range of 95% to 99%, and the light transmittance for the (thinner) magnetic tape T will be 2.4% (at maximum, where the light transmittance for the conventional magnetic tape is 1.2% or less).

As the light transmittance for the light-shielding members "a" through "r" is 50%, the light transmittance for detecting the tape end will satisfy the specification under the "VHS" format products. Correspondingly, upon using the magnetic tape having the light transmittance for 1.7%, the light transmittance for the light-shielding members "a" through "r" should be 70% so that the light transmittance for detecting tape end will satisfy the specification under the "VHS" format products.

According to the present invention described above, the light-shielding members are placed in the light path for detecting the tape end so as to keep the light transmittance within the predetermined range so that the tape end can be detected by the difference of the light transmittance of the magnetic tape portion and leader tape portion, even when the magnetic tape is very thin that it has higher light transmittance than the predetermined value. Accordingly, there provided a tape cassette for having even thinner magnetic tape for long time recording with higher electromagnetic conversion characteristic and higher light transmittance which tape end can be detected accurately.

The tape cassette in accordance with the present invention is described as for use in the apparatus such as the VCR having the detecting light device P and the light sensor S1 and S2. However, the tape cassette in accordance with the present invention is not limited to be used only in a VCR having recording and reproducing function. It is obvious that the tape cassette in accordance with the present invention can also be used for a reproducing apparatus, a recording apparatus or a similar apparatus having the detecting light device and the light sensor for detecting the tape end of magnetic tape in the tape cassette.

As described above, the present invention provides at least one light-shielding member in the light path formed in the tape cassette to shield the light emitted from the detecting light device (light source), wherein the light transmittance at the light sensor is adjusted to be below the predetermined value so that the tape end for the magnetic tape having light transmittance above the predetermined value (i.e. 1.2% and 2.4% at maximum) can be detected precisely. Consequently, a thinner magnetic tape having higher light transmittance with enhanced electromagnetic conversion characteristics.

What is claimed is:

1. A magnetic tape cassette used in an apparatus having a light source and a light sensor for detecting a tape end by the difference of light transmittance of a tape loaded in the magnetic tape cassette, the magnetic tape cassette comprising:

a tape having a magnetic layer portion for recording and reproducing information and a leader portion connecting with a reel for winding and unwinding the tape thereof, wherein the leader portion has higher light transmittance than the magnetic layer portion;

a cassette housing enclosing the reel, the housing having a light exit opposite the light sensor when the magnetic tape cassette is loaded to a predetermined position in the apparatus, for passing light from the light source to the light sensor through the light exit, wherein a light path of the light emitted from the light source crosses a travel path of the tape;

wherein the cassette housing further comprises an upper half cassette housing and a lower half cassette housing; and a light-shielding member being disposed in the light path, for decreasing the light transmittance of the tape being detected by the light sensor to a predetermined value.

2. The magnetic tape cassette as claimed in claim 1, wherein the light-shielding member is molded selectively in either the upper half or the lower half of the cassette housing.

3. The magnetic tape cassette as claimed in claim 1, wherein the light-shielding member is selected from a group composed of a tape pad, a lock plate, the upper half cassette housing, the lower half cassette housing and a rib of the cassette housing.

* * * * *